UNITED STATES PATENT OFFICE.

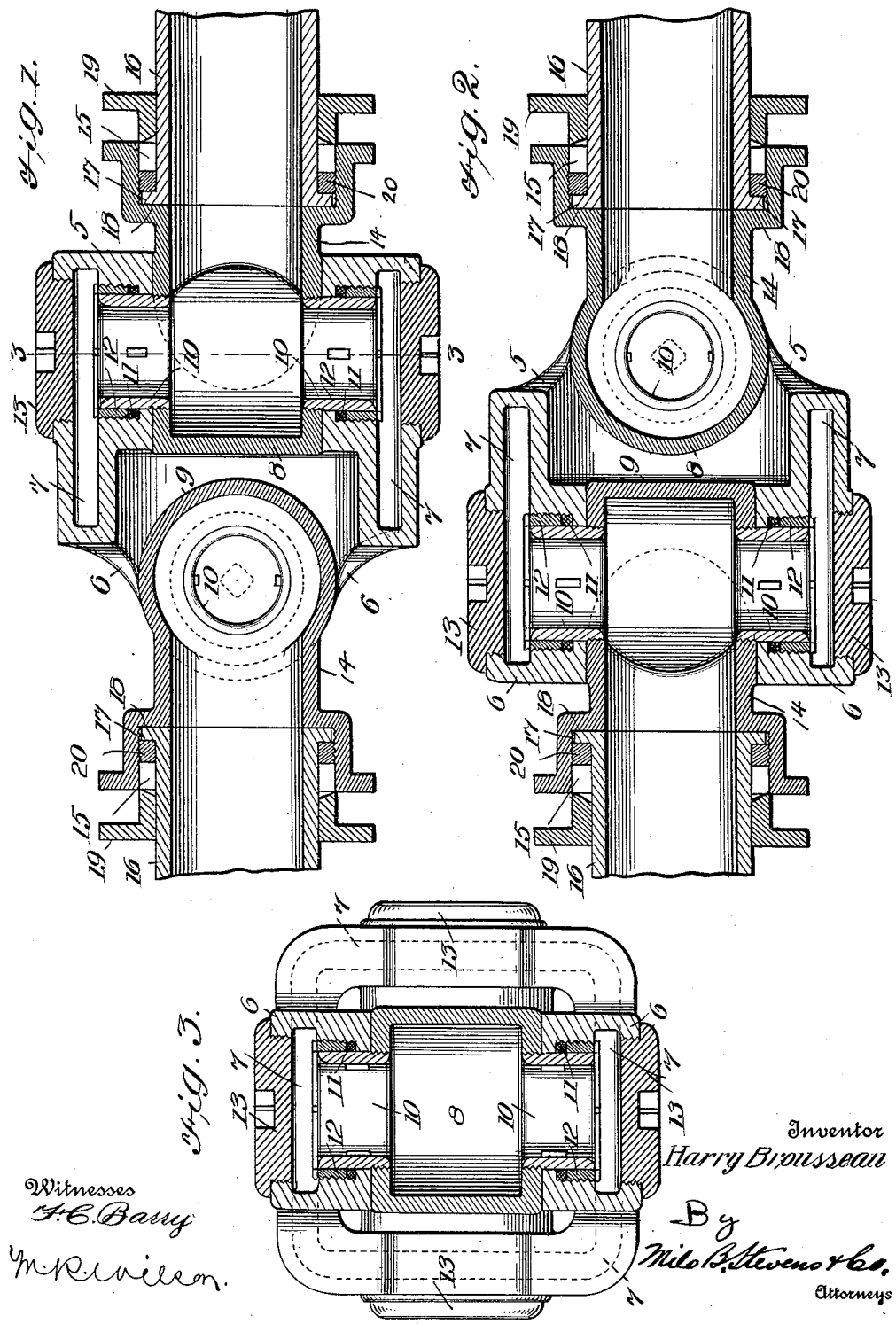

HARRY BROUSSEAU, OF NEW YORK, N. Y., ASSIGNOR OF ONE-HALF TO MARCUS STERN, OF NEW YORK, N. Y.

PIPE-JOINT.

1,005,407.

Specification of Letters Patent.  Patented Oct. 10, 1911.

Application filed August 19, 1910. Serial No. 577,968.

*To all whom it may concern:*

Be it known that I, HARRY BROUSSEAU, a citizen of the United States, residing at 150 Nassau street, New York, in the county of New York and State of New York, have invented certain new and useful Improvements in Pipe-Joints, of which the following is a specification.

This invention relates to improvements in flexible pipe fittings for connecting steam, air and other pipes, the object of the invention being to provide a fitting of this kind which permits the connected pipe sections to freely assume any position without straining any part of the fitting, and also to provide the fitting with passages of ample area to take care of the flow of steam or other fluid therethrough.

The invention also has for its object to so arrange the parts that the pressure in the fitting is perfectly balanced.

A further object of the invention is to provide a fitting of the kind stated which is simple in construction, and devoid of parts subject to excessive wear.

With these, and other objects in view, as will appear when the nature of the invention is better understood, the same consists in a novel construction and arrangement of parts to be hereinafter described and claimed, reference being had to the accompanying drawing forming a part of this specification, in which drawing—

Figures 1 and 2 are longitudinal sectional views taken at right angles to each other. Fig. 3 is a cross section on the line 3—3 of Fig. 1.

Referring specifically to the drawing, the main body of the fitting comprises a member which is forked at its ends. The branches of one fork are indicated at 5, and those of the other fork are indicated at 6. The forks are positioned at right angles to each other, so that the members which are connected thereto may swing in planes at right angles to one another. Thus, if the fitting is placed so that one of the members may swing in a vertical plane, the other member may be swung in a horizontal plane.

The fork branches are hollow to form passages 7 through which the steam or other fluid flows, the passages of the branches of one fork communicating with the passages of the other fork branches.

Between the fork branches 5 is mounted a header 8, and between the fork branches 6 is mounted a similar header 9. Each header comprises a hollow body fitting snugly between the fork branches. To opposite sides of the body are connected, by being screwed thereinto, trunnions 10, said trunnions being hollow and open at each end, one of said ends opening into the interior of the header and the other end opening into the passage 7. The trunnion extends into an opening made in the inner face of the fork branch, and said opening is counterbored as indicated at 11 to form a stuffing box containing a suitable packing which is compressed and held in place by a ring 12 encircling the trunnion and screwing into the stuffing box. By this means, a fluid tight joint is had between the trunnion and the fork branch. In the outer face of the fork branch, in line with the opening in which the trunnion seats, is an opening which is closed by a screw plug 13, this opening being provided for the purpose of permitting the assembling of the parts. Inasmuch as the trunnions are all connected to the respective fork branches in a like manner, a description of one connection suffices for all.

Each header is provided with a neck 14 which is formed with a stuffing box 15 into which extends a pipe section 16 formed at its inner end with an exterior annular flange 17. This flanged end of the pipe section engages a shoulder 18 formed by the inner end of the stuffing box. A suitable gland nut 19 is provided for compressing and holding the packing in the stuffing box. The inner end of the stuffing box is screw-threaded to receive a ring 20 which encircles the pipe section 16 and screws against the flange 17, the latter being thus located between the shoulder 18 and the ring 20, whereby separation of the pipe section and the header is prevented, the shoulder 18 preventing inward movement of the pipe section, and the ring preventing outward movement thereof. The pipe section however fits sufficiently loose in the stuffing box so as to permit relative turning movement of the fitting and the pipe section, the axis of rotation of the pipe section coinciding with the longitudinal axis of the fitting.

In operation, the parts being assembled as herein described, steam or other fluid enters one of the headers through the pipe section connected thereto, and flows through the hollow trunnions into the passages 7 of the fork to which said trunnions are connected, and thence by the way of the passages 7 in the other fork through the trunnions connected thereto, and thence into the other header, and out of the latter through the pipe section connected thereto. The double opening of the headers into the forks provides a sufficient area to take care of the flow without a retardation thereof, and the pressure is also balanced. The fitting moves freely on all the joints irrespective of the pressure, and adjusts itself to any position without a strain on the parts. The device is also simple in construction and without parts to wear out, and it can be readily assembled.

I claim:

1. A pipe coupling comprising a member having forked ends, the branches of the forks being hollow, and the passages thus formed being intercommunicating, and said forks being arranged at right angles to each other, headers pivotally connected to the respective forks between the branches thereof, and having their interior in communication with the aforesaid passages, and pipe sections rotatably connected to the respective headers, the axis of rotation of said pipe sections coinciding with the longitudinal axis of the coupling.

2. A pipe coupling comprising a member having forked ends, the branches of the forks being hollow, and the passages thus formed being intercommunicating, and said forks being arranged at right angles to each other, headers pivotally connected to the respective forks between the branches thereof, and having their interior in communication with the aforesaid passages, necks extending from the headers and provided with stuffing boxes, flanged pipe sections extending into the stuffing boxes and free to rotate therein, the axis of rotation of said pipe sections coinciding with the longitudinal axis of the coupling, and retaining rings in the stuffing boxes engageable with the flanges of the pipe sections.

3. A pipe coupling comprising a member having forked ends, the branches of the forks being hollow, and the passages thus formed being intercommunicating, and said forks having openings in their inner faces to the passages, said openings being counterbored adjacent to the passages to form stuffing boxes, and said forks also having openings in their outer faces in line with the first mentioned openings, closures for the second-mentioned openings, headers mounted between the fork branches, hollow trunnions carried by the headers, and extending into the first mentioned opening and through the stuffing boxes thereof, the trunnions being open at their ends, and gland rings mounted in the stuffing boxes and encircling the trunnions.

In testimony whereof I affix my signature in presence of two witnesses.

HARRY BROUSSEAU.

Witnesses:
AL. H. GRAHAM,
MARCUS STERN.